(12) United States Patent
Freyermuth

(10) Patent No.: US 6,216,335 B1
(45) Date of Patent: Apr. 17, 2001

(54) DEVICE FOR ASSEMBLING AND DISASSEMBLING A TOOL WITH A TOOL HOLDER

(75) Inventor: Alain Freyermuth, Pfaffenhoffen (FR)

(73) Assignee: E.P.B. Emile Pfalzgraf (Societe Anonyme), Bouxwiller (FR)

( * ) Notice: Subject to any disclaimer, the term of this patent is extended or adjusted under 35 U.S.C. 154(b) by 0 days.

(21) Appl. No.: 09/267,679

(22) Filed: Mar. 15, 1999

Related U.S. Application Data

(63) Continuation of application No. PCT/FR98/01878, filed on Sep. 1, 1998.

(30) Foreign Application Priority Data

Sep. 5, 1997 (FR) .................................................. 97 11195

(51) Int. Cl.⁷ .................................................. B23P 21/00
(52) U.S. Cl. .............................. 29/701; 29/800; 432/230; 408/239 A
(58) Field of Search .................................... 432/224, 225, 432/230, 231, 253; 408/144, 238, 239 A; 219/635, 674, 677; 29/447, 700, 800, 701

(56) References Cited

U.S. PATENT DOCUMENTS

| | | | |
|---|---|---|---|
| 1,909,982 | * | 5/1933 | Parker . |
| 2,632,841 | * | 3/1953 | Wharff . |
| 2,948,797 | * | 8/1960 | Kurtz et al. ........................... 219/674 |
| 4,104,498 | * | 8/1978 | Gerber .................................. 219/635 |
| 4,565,358 | * | 1/1986 | Hosoi et al. . |
| 4,775,135 | * | 10/1988 | Leibinger . |
| 5,280,671 | | 1/1994 | Marquart . |
| 5,311,654 | * | 5/1994 | Cook . |
| 5,428,208 | * | 6/1995 | Chatterjee et al. ................... 219/635 |
| 5,582,494 | * | 12/1996 | Cook ....................................... 29/447 |
| 5,702,667 | * | 12/1997 | Pond .................................... 219/635 |
| 5,933,941 | * | 8/1999 | Kelly ...................................... 29/700 |

FOREIGN PATENT DOCUMENTS

| | | | |
|---|---|---|---|
| 21658 | * | 5/1902 | (DE) . |
| 0 437 322 | | 7/1991 | (EP) . |

* cited by examiner

Primary Examiner—S. Thomas Hughes
Assistant Examiner—Steve Blount
(74) Attorney, Agent, or Firm—Young & Thompson

(57) ABSTRACT

A device for assembling and disassembling a tool with a tool holder, such as particularly a mandrel. The device is essentially constituted by a support frame (4) provided with a unit (5) for receiving and holding a tool holder (3), elements (6 and 7) for ensleeving and extracting a tool (2) coacting with an induction heating unit (8) for the portion (3') of the tool holder (3) adapted to receive the tool (2) by ensleeving.

9 Claims, 2 Drawing Sheets

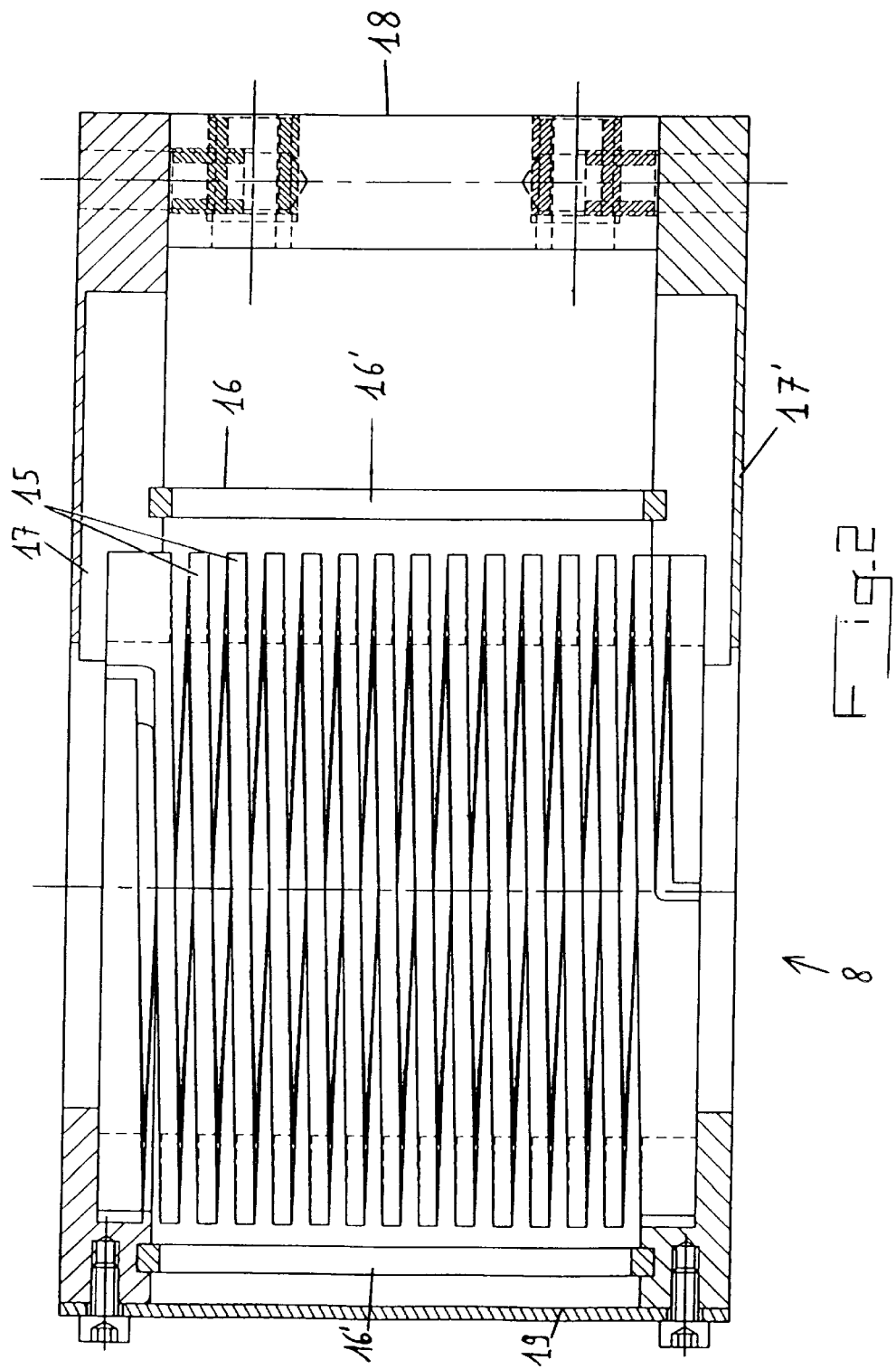

DEVICE FOR ASSEMBLING AND DISASSEMBLING A TOOL WITH A TOOL HOLDER

CROSS REFERENCE TO RELATED APPLICATION

This is a continuation of international application PCT/FR98/01878 filed on Sep. 1, 1998, which designated the United States of America.

FIELD OF THE INVENTION

The present invention relates to the field of machine tool accessories, particularly digitally controlled machine, machining centers, transfer machines or lines, by machining at high speed or in which a high precision of concentricity is required, and has for its object a device for automatically assembling and disassembling tools with a tool holder by thermal expansion of this latter.

BACKGROUND OF THE INVENTION

The principle of hooping has been known for a long time, also in the context of assembling tools/tool holders.

Thus, there exist at present devices for hooping tools/tool holders with manual intervention for ensleeving, requiring the rotation of the tool holders, which do not guarantee the complete ensleeving over the desired height (with risk of loss of the tool being machined), and again others which do not have a safety of use necessary for industrial employment.

Moreover, the heating of the tool holders or of the tool/tool holder assembly is carried out at present either by direct application of flame, or by projection of radiant heat or a flow of hot air or again by conductive contact, the use of the two first heating techniques being often delicate in an industrial setting and the third heating technique being less efficacious in giving rise to too long a heating time.

Moreover, none of the known processes or device permits limiting heating to a value just enough to assemble or disassemble the tool with the tool holder.

SUMMARY OF THE INVENTION

The present invention has for its object to overcome these drawbacks by providing particularly an assembly and disassembly device permitting the rapid mounting and unmounting of tools under conditions of optimum safety, whilst using only the temperature just necessary for ensleeving (or separation) so as not to damage the tool holders by overheating.

To this end, the present invention has for its object a device for assembling and disassembling a tool with a tool holder, such as particularly a mandrel, characterized in that it is essentially constituted by a support frame provided with means for receiving and holding a tool holder and for means of ensleeving and extracting a tool coacting with a heating means by induction, of the portion of the tool holder adapted to receive the tool by ensleeving.

BRIEF DESCRIPTION OF THE DRAWINGS

The invention will be better understood from the following description, which relates to a preferred embodiment, given by way of non-limiting example, and explained with reference to the accompanying schematic drawings, in which:

FIG. 2 is a detailed side elevational view, partially in cross-section, on a different scale, of an inductive heater which is a portion of the device shown in FIG. 1.

DETAILED DESCRIPTION OF THE INVENTION

Figures 1, 3:
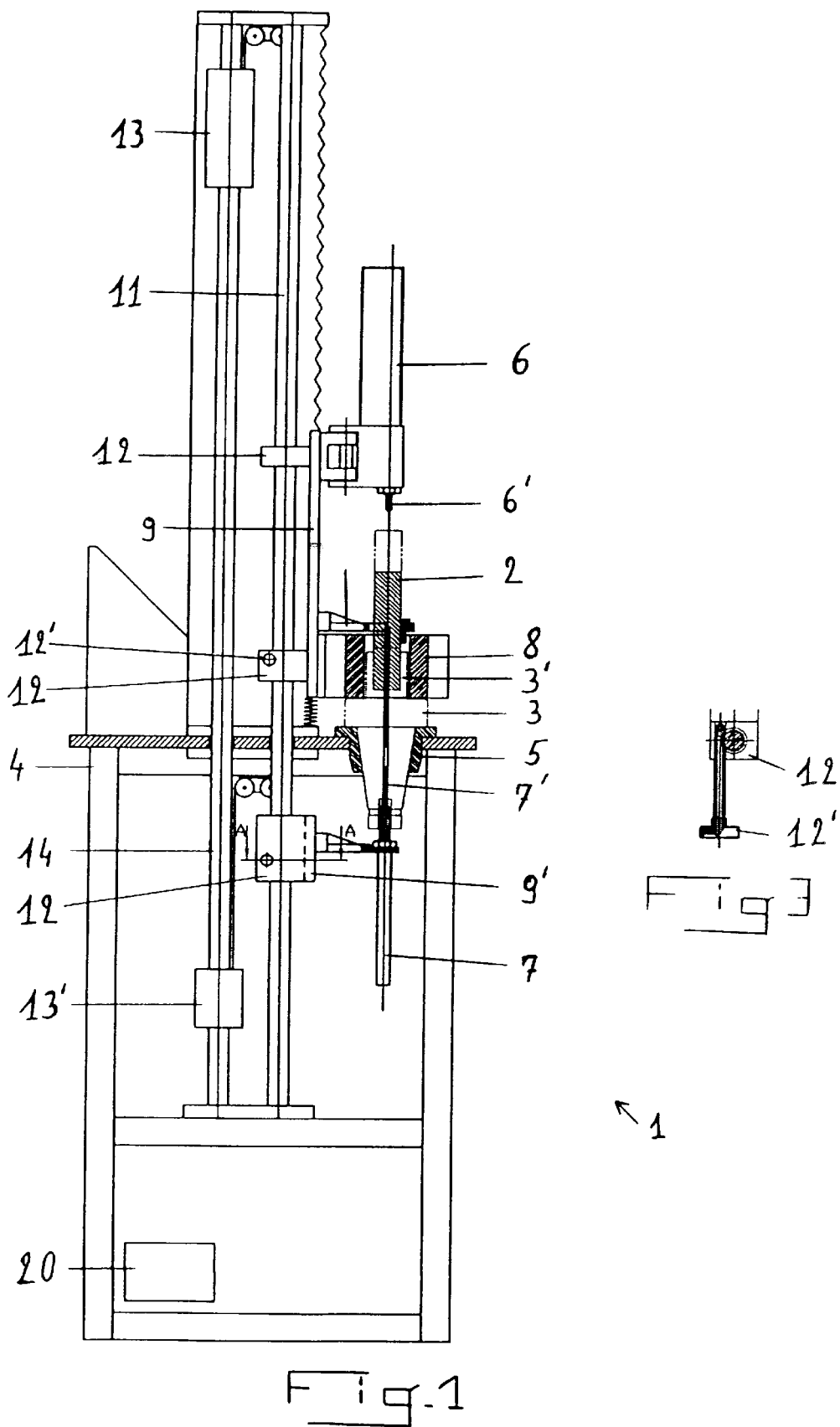
FIG. 1 is a side elevational view partly in cross-section, of an assembly and disassembly device according to the invention.
FIG. 3 is a cross-sectional view on the line A—A of a detail of the device shown in FIG. 1.

According to the invention, and as shown in FIG. 1 of the accompanying drawings, the device 1 for assembling and disassembling a tool 2 with a tool holder 3, is essentially constituted by a support frame 4 provided with means 5 for receiving and holding a tool holder 3 and means 6 and 7 for ensleeving and extracting a tool 2 coacting with a means 8 for induction heating of the portion 3' of the tool holder 3 adapted to receive the tool 2 by ensleeving.

The means 5 for receiving and holding the tool carrier 3 could, for example, consist of a socket adapted to the size of the tool holder 3 in question, and provided with gripping means, or a vise whose jaws are shaped to come into intimate contact with the body of a tool holder 3.

The ensleeving and, more particularly, the separation of the tool 2 from the tool holder 3 are facilitated when said tool 2 has a value of thermal expansion coefficient substantially less than that of the tool holder 3, and more preferably when the tool 2 is of an amagnetic or weakly magnetic material.

As shown in FIG. 1 of the accompanying drawings, the support frame 4 or bank preferably has a vertical structure and the ensleeving means 6 and extraction means 7 and the induction heating means 8 are mounted, with the possibility of being blocked in position, along at least one slide 9, 9' secured to the support frame 4, whilst being concentric or aligned with the longitudinal axis of the tool holder 3 mounted in the receiving and holding means 5.

According to one characteristic of the invention, the ensleeving means 6 and extraction means 7 consist of linear actuators with mutually opposite actions prolonged by thrust members 6', 7' adapted to come into contact with the tool 2, and to which one, 6, is located above and the other, 7, below the means 5 for receiving and holding the tool holder 3, a means 10 for holding the tool 2 in alignment with the tool holder 3 and for guiding during ensleeving and separation being provided between the ensleeving means 6 and the means 5 for receiving and holding the tool carrier 3, for example, in the form of a tube holder mounted on the slide 9, 9' and provided with a tube suitable for the diameter of the tool 2 to be ensleeved, and interchangeable.

The blocking in position of the means 6, 7, 8 and 10 on the slide or slides 9, 9' could for example be carried out by means of a system of the tangent plug type and said slide or slides 9, 9' preferably have a profiled or doubled or divided structure, for example in the form of two spaced parallel bars.

The thrust member 6' of the ensleeving means 6 could for example have the form of a finger, whilst the thrust member 7' of the extraction means 7 could consist of a prolonged rod, adapted to extend through the central opening of the tool holder 3 and be received in a suitable blind opening provided in the base of the tool 2 (see FIG. 1).

So as to facilitate the emplacement and extraction of the tool holder 3 relative to the means 5 for receiving and holding, it could be provided that the ensleeving means 6 can be displaced between, on the one hand, a centered use position in which it is aligned with the tool holder 3 mounted in the corresponding means 5 for reception and holding and, on the other hand, a retracted or angularly offset non-use position in which it is located outside the field of vertical interference with said tool holder 3, said ensleeving means 6 being adapted to be blocked rigidly in each of the two mentioned positions.

According to one characteristic of the invention, shown in FIG. 1 and, more particularly in FIG. 2 of the accompanying drawings, the induction heating means 8 consists of tubular or annular induction coil formed by a helicoidal winding 15 or several concentric helicoids with rectangular cross-section and adapted to surround the portion 3' of the tool holder 3 receiving the tool 2, its height being at least equal to that of said portion 3' of the tool holder 3.

According to a preferred embodiment of the invention, the induction heater 8 is in the form of a single helicoidal winding 15 whose rectangular cross-section is prolonged or oriented radially.

So as to increase the effectiveness of induction heater 8 and to limit the magnetic losses, the tubular or annular induction heater 8 can preferably be surrounded by a cylindrical concentric cage 16 of a magnetic material, comprising openings or prolonged holes 16' oriented in the direction of the axis of the tubular or annular induction heater and distributed circumferentially in a spaced manner.

The openings in the form of slots 16' provided in the cylindrical wall of the annular cage 16 divide said wall into several blades oriented parallel to the lines of magnetic flow and promote containment of the field produced by the induction heater 8, whilst avoiding magnetic loss due to non-aligned lines of flux.

The helicoidal winding 15 could preferably have about 15 turns and a cross-section of about 20 mm$^2$, permitting the passage of a current of about 70 A and permitting heating of the portion 3' of the tool carrier 3 to a temperature of about 200 to 250° C.

As shown in FIG. 2 of the accompanying drawings, the helicoidal winding or windings 15 and the concentric cylindrical cage 16, are secured together by two perforated plates 17 and 17' assembled rigidly together by a securement plate 18, the assembly being covered by an envelope 19 of an amagnetic insulating material.

So as to permit rapid retraction of the assembly of the tool holder 3/tool 2 after assembly, the device 1 according to the invention can moreover comprise an in situ cooling means for the tool holder 3 after ensleeving of the tool 2 such as, for example, a system of ejection or blowing air, vaporizing a heat exchange gas, or the like.

A controlled and automatic program of the assembly and disassembly operations can be obtained by also providing an automatic control and monitoring unit 20, such as for example a programmable computer, controlling the manipulation of the means 6 and 7 for ensleeving and extracting and managing the supply of the induction heating means 8, as a function particularly of the movements at the level of the ensleeving and/or extraction means 6, 7 continuously bearing with constraint against the tool 2 during the operations of assembly and disassembly.

Of course, the invention is not limited to the embodiment described and shown in the accompanying drawings. Modifications remain possible, particularly as to the construction of the various elements or by substitution of technical equivalents, without thereby departing from the scope of protection of the invention.

What is claimed is:

1. Device for assembling and disassembling a tool with a tool holder, comprising a support frame having a vertical structure and means for receiving and holding a tool holder;

ensleeving means for ensleeving a tool;

extracting means for extracting the tool;

said ensleeving means and extracting means coacting with an induction heating means for heating a portion of the tool holder adapted to receive the tool by ensleeving;

said induction heating means comprised of a tubular or annular induction heater formed by one of a helicoidal winding and a plurality of concentric helical windings structured and arranged to surround the portion of the tool holder receiving the tool;

said ensleeving means, said extraction means, and said induction heating means including means for being mounted and blocked in position, on at least a slide secured to the support frame, and being concentric or aligned with a longitudinal axis of the tool holder mounted in the means for receiving and holding;

an upper slide portion carrying the ensleeving means, the induction heating means and a means for maintaining alignment of and for guiding the tool;

a lower slide portion carrying the extraction means;

each of said slide portions being mounted slidably on a first profiled vertical structure by guide collars provided with position blocking means and counterbalanced by counterweights appropriate to the respective mass of the corresponding portion of the slide and of the means carried by said corresponding portion; and said counterweights being structured and arranged to be slidably mounted on a second profiled vertical structure, parallel to the first profiled vertical structure carrying said slide portions.

2. The device according to claim 1, wherein the ensleeving means and extraction means comprise linear actuators with opposite actions prolonged by thrust members structured and arranged to come into contact with the tool; one of said ensleeving means and extraction means being located above, the other being located below the means for receiving and holding the tool holder; said means for maintaining alignment of and for guiding the tool being positioned between the ensleeving means and the means for receiving and holding the tool holder.

3. The device according to claim 1, wherein the ensleeving means is structured and arranged to be displaced between a centered position of use in which the ensleeving means is aligned with the tool holder mounted in the corresponding means for receiving and holding, and a retracted or angularly offset non-use position in which said ensleevement means is located outside a vertical field of movement of said tool holder; and said means for being mounted and blocked in position comprising means for rigidly blocking said ensleeving means in each of the two positions.

4. The device according to claim 1, wherein the one of a helicoidal winding and helical windings has a rectangular cross section, said induction heating means having a height at least equal to that of the portion of the tool holder.

5. The device according to claim 4, wherein the induction heater is formed from a single helicoidal winding having a rectangular cross-sectional structure which is radially prolonged.

6. The device according to claim 4, wherein the induction heater is surrounded by a cylindrical concentric cage of a magnetic material comprising prolonged slots oriented in the direction of the axis of the induction heater and distributed circumferentially in a spaced manner.

7. The device according to claim 6, wherein the one of a helicoidal winding and helical windings and the concentric cylindrical cage are secured together by two perforated plates rigidly connected together by a securement plate to form an assembly; the assembly being covered by an envelope of an amagnetic insulating material.

8. The device according to claim 1, further comprising an in situ cooling means for cooling the tool holder after ensleeving the tool.

9. The device according to claim 1, further comprising an automatic control and inspection unit for managing manipulation of the ensleeving and extraction means, and for controlling supply of the induction heating means as a function of vertical movements at the level of one of the ensleeving means and the extraction means continuously bearing against the tool during assembling and disassembling operations.

* * * * *